United States Patent [19]

Inoue

[11] Patent Number: 4,536,366
[45] Date of Patent: * Aug. 20, 1985

[54] SINTERING METHOD AND APPARATUS

[75] Inventor: Kiyoshi Inoue, Tokyo, Japan

[73] Assignee: Inoue-Japax Research Incorporated, Yokohama, Japan

[*] Notice: The portion of the term of this patent subsequent to Jun. 16, 1998 has been disclaimed.

[21] Appl. No.: 517,469

[22] Filed: Jul. 26, 1983

Related U.S. Application Data

[60] Continuation of Ser. No. 225,988, Jan. 19, 1981, abandoned, which is a division of Ser. No. 27,662, Apr. 6, 1979, Pat. No. 4,273,581.

[30] Foreign Application Priority Data

| Apr. 7, 1978 [JP] | Japan | 53-40193 |
| Apr. 24, 1978 [JP] | Japan | 53-47902 |
| Sep. 18, 1978 [JP] | Japan | 53-113644 |
| Oct. 4, 1978 [JP] | Japan | 53-121466 |
| Oct. 17, 1978 [JP] | Japan | 53-128144 |

[51] Int. Cl.$^3$ ............................................. B22F 3/16
[52] U.S. Cl. ............................................. 419/11; 419/51; 419/52; 264/120; 100/38; 100/42
[58] Field of Search ............ 419/51, 52, 48, 11; 264/120; 100/38, 42

[56] References Cited

U.S. PATENT DOCUMENTS

| 2,894,281 | 7/1959 | Pouse et al. | 425/78 |
| 3,107,395 | 10/1963 | Bundy | 425/77 |
| 3,134,139 | 5/1964 | Wentorf, Jr. | 419/51 X |
| 3,150,413 | 3/1964 | Zeitlin et al. | 419/51 X |
| 3,241,956 | 3/1966 | Inoue | 419/52 |
| 3,861,966 | 1/1975 | Scheithauer, Jr. | 419/19 X |
| 4,273,581 | 6/1981 | Inoue | 419/51 X |

FOREIGN PATENT DOCUMENTS

| 1227405 | 4/1971 | United Kingdom . |
| 1352061 | 5/1974 | United Kingdom | 419/51 |

*Primary Examiner*—Edward A. Miller
*Assistant Examiner*—Matthew A. Thexton
*Attorney, Agent, or Firm*—Owen, Wickersham & Erickson

[57] ABSTRACT

Sintering method and apparatus. A pre-sintered or compacted mass of particulate material is densified by loading the mass into a substantially closed three-dimensional space defined by three pairs of punches juxtaposed thereacross in three respective directions, and then by multi-axially compressing the mass by advancing the punches of each pair toward each other while energizing the mass with thermal energy. The axes of action of pressures applied thereto by the three pairs of punches intersect substantially at a point substantially constituting the center of the three-dimensional space.

7 Claims, 10 Drawing Figures

SINTERING METHOD AND APPARATUS

REFERENCE TO RELATED APPLICATION

This application is a continuation of application Ser. No. 225,988, filed Jan. 19, 1981, abandoned, which was a division of application Ser. No. 27,662 filed Apr. 6, 1979, now U.S. Pat. No. 4,273,581.

FIELD OF THE INVENTION

The present invention relates generally to a sintering method and apparatus. More particularly, it relates to a method of and apparatus for sintering a mass of particulate material, which is metallic or non-metallic (e.g., metal oxides and carbon), to form a coherent or densified object therefrom by simultaneously applying both heat and pressure to the mass in a controlled manner.

The term "mass of particulate material" used herein is intended to include a mass of discrete particles and also a consolidated mass of particles after compaction, preliminary heating or sintering.

BACKGROUND OF THE INVENTION

In the traditional powder-metallurgy art, it has long been a practice to heat a precompacted body of particulate material to obtain a sintered object therefrom. According to the known process, however, sintered end products of desired quality may not be obtained and certain materials may not lend themselves to satisfactory sintering. In another known sintering technique which is commonly called "hot pressing", a mass of particulate material is placed in a mold such as of graphite and therein compressed between a pair of plungers while simultaneously being heated with heating current passing directly through the mass, through the mold or through an induction heating coil arranged to surround the mass and mold. The hot pressing is sometimes carried out isostatically or semi-isostatially with compression force applied uniformly to the mass peripherally toward central point or axis thereof.

In any of the known sintering techniques, however, a problem has now been recognized that directional variations develop in the quality of a sintered product due to the fact that sintering crystals in the mass are forced to grow with their easy-to-slip surfaces aligned in the direction in which the pressure is applied to the mass. Thus, insufficiencies in the density and lack of uniformity in the quality of sintered products result, this being particularly noticeable where the sintering particles have tendency to generate a large quantity of gaseous decompositions.

OBJECT OF THE INVENTION

It is accordingly a principal object of the present invention to provide a method of sintering a mass of particulate material which eliminates or alleviates the aforementioned disadvantages of the conventional sintering techniques and whereby a sintered object of improved qualities and free from internal defects is obtained.

Another object of the present invention is to provide a sintering apparatus for carrying out the method.

SUMMARY OF THE INVENTION

In accordance with the present invention, there is provided a method of sintering a mass of particulate material, comprising the steps of: loading the mass into a substantially closed three-dimensional space defined by a first, a second, and a third pair of punches juxtaposed thereacross in a first, a second, and a third direction, respectively; energizing the mass while multi-axially compressing it by advancing relatively to each of the three pairs of punches in the respective directions, thereby applying to the mass a pressure in a first direction along a first axis, applying to the mass a pressure in a second direction along a second axis which is transverse to a plane containing the first axis and applying to the mass a pressure in a third direction along a third axis which is transverse to a plane defined by the first and second axes while heating the mass; so that the axes of action intersect substantially at a point substantially constituting the center of the three-dimensional space; and, in response to a shrinkage of the mass being subjected to heating, modifying successively said pressures along the first, second and third axes while continuing to heat the mass.

The second axis may be transverse and, preferably, substantially perpendicular to the first axis while the third axis may be transverse and, preferably, substantially perpendicular to both the first and second axes.

SPECIFIC DESCRIPTION

Figure 1:
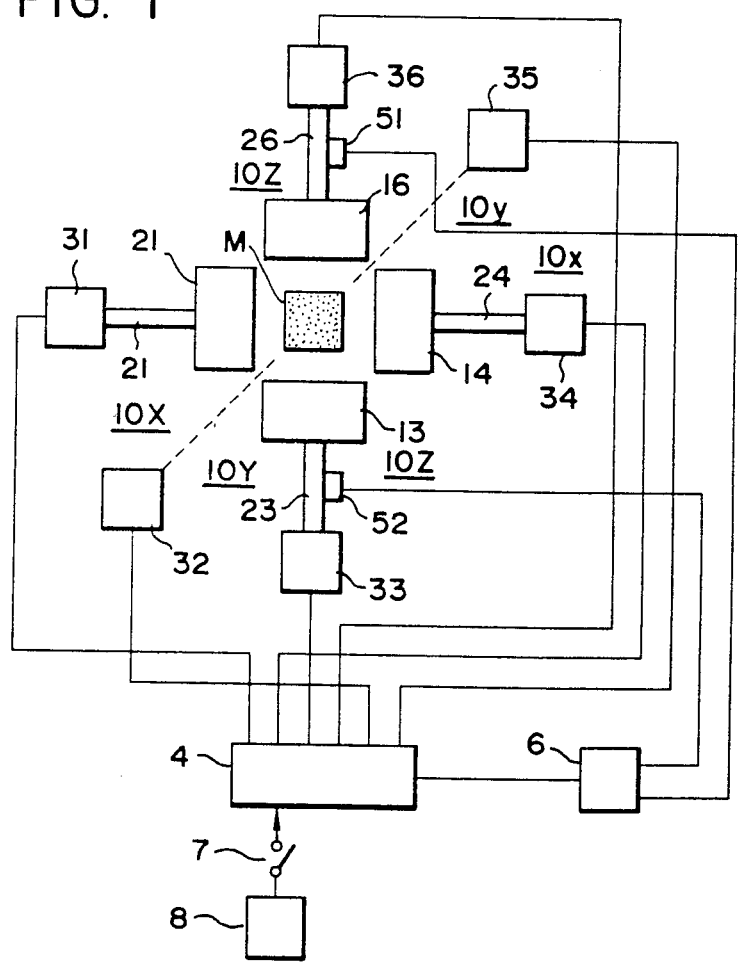
FIG. 1 is a schematic diagram illustrating a multiple-axis compression sintering system according to the present invention.

Referring now to FIG. 1 there is shown a multi-axial compression system 10 for a mass of particulate material M, which includes six independent press units 10X, 10Y, 10Z, 10x, 10y and 10z for compressing the mass M three-dimensionally. Each of the press units comprises a punch as designated at 11, 13, 14 and 16 and a hydraulic or oil-pressure cylinder arrangement as designated at 21, 22, 23, 24, 25 and 26 with each cylinder when actuated advancing the punch coupled thereto with a piston as designed at 21, 23, 24 and 26 against the mass M. In this case, press units 10X and 10x constitute a pair to compress the mass M therebetween along X—x axis. Likewise, press units 10Y and 10y, and press units 10Z and 10z constitute pairs to compress the mass M therebetween along Y—y and Z—z axes, respectively. Axes X—x, Y—y and Z—z lie perpendicularly to one another.

For effecting the selective actuation and control of the plural independent presses 10X, 10Y, 10Z, 10x, 10y and 10z there is provided a control unit 4 designed to furnish the cylinder units 31, 32, 33, 34, 35 and 36 individually with drive signals in response to a shrinkage of the mass of particulate material M as detected by punch position sensors 51 and 52. The latter may be constituted by sensing coils of a pair of differential transformers whose cores are carried by the Z-axis piston 23 and the Z-axis piston 26, respectively. Thus, the control unit 4 is on one hand fed by the punch position sensors 51 and 52 via a discriminator or threshold circuit 6 which provide a control signal when the mass M is detected to have undergone a predetermined shrinkage and on the other hand by a drive control pulser 8 via a switch 7.

Although not shown, there is provided means for heating the mass M, which may be any of known systems suitable to apply to the mass M a sintering heat, e.g. an induction heating unit with a coil arranged to surround the mass or an electrical heating unit with any one or more diametrically opposite pairs of the punches 21 to 26 as current conducting electrodes.

In operation, the Z—z axes press units 10Z and 10z may first be driven to compress the mass M under a given initial pressure. Thus, with the switch 7 closed, the pulser 8 provides drive pulses to the control unit 4 which selectively transmits them to the cylinder units 33 and 36 to advance the punches 23 and 26 until the incremental drive reaches a predetermined displacement defined by the corresponding number of drive pulses counted at the control unit 4. At this stage, the heater unit not shown has already been actuated to apply the sintering heat to the mass M. This simultaneous heating and initial compression serves to activate the particulate material by stripping impurities and gaseous substances adherent on individual particles and releasing them from the particle—particle interfaces in the mass M. Mutual intimate contacts between the particles are thus established and the shrinkage of the mass commences. With the progress of interparticle partial diffusion, the mass M will become ready for plastic deformation so that the continued compression by the punch 23 and 26 gives rise to a sudden shrinkage of the mass M when a predetermined threshold condition is reached. The progress of the mass shrinkage is monitored by the sensors 51 and 52 which provide signals representing the positions of the punches 23 and 26. The signals are fed to the discriminator 6 and when one or two threshold values set therein are traversed, the latter produces an appropriate signal to indicate the mass M attaining a predetermined degree of shrinkage. The signal is fed to the control unit 4 whose state is thereby switched to cease drive pulses to the cylinders 33 and 36 while channeling them into a next axial pair of cylinders, say, cylinders 31 and 34 to cause the mass M to be compressed along the X—x axes. The compression of the mass M along the X—x axes continues for a predetermined time period or until a predetermined number of drive pulses are counted by the control unit 4 and then channeled into a next pair of cylinders, say, 32 and 35. Thus, the plural press units 10X, 10Y, 10Z, 10x, 10y and 10z are successively actuated so as to successively switch the direction in which the mass M is compressed as in the order of Z—z→X—x→Y—y→Z—z→X—x-→Y—y. In this latter, successive compression stage, the pressure may be an elevated pressure substantially higher than the initial pressure and may be successively increased as the cycle of successive compression is repeated.

The multi-axial successive compression effected in this manner following a sudden shrinkage of the mass in its initial sintering stage allows a sintered mass of a high quality with favorable random crystal orientations to result. By successively changing the direction in which the mass is compressed, material flow is effected multi-directionally and randomly in a unit area or volume of the mass with violent flow directional changes each time the compression direction is altered to allow firm interparticulate bonds to be established to increase the sintering strength and density.

EXAMPLE I

A mass of 300 mesh petroleum coke and 6% by weight tar (120° C. melting point) was initially compressed under a pressure of 350 Kg/cm$^2$ along Z—z axes between a pair of punches which also served as electrodes in an electrical sintering system in which a heating current of density of 550 amperes/cm$^2$ was passed through the mass. When the mass shows a certain shrinkage as detected by the positions of the punches (when its temperature reached to 1850° to 2000° C.), the pressure was elevated to 1.3 tons/cm$^2$ and the direction in which this pressure was applied to the mass was successively changed as follows: X—x-→Y—y→Z—z→X—x→Y—y→ to complete the sintering operation. The resulting sintered body (A) and bodies (B and C) prepared by the conventional sintering technique were used as electrodes in electrical discharge machining with kerosene as the machining fluid and a series of machining pulses having a pulse peak current Ip=12 amperes and a pulse duration $\tau_{on}$=55 microseconds. The machining results are shown below.

TABLE 1

|   | Surface Roughness | Machined Surface | Relative Electrode Wear |
|---|---|---|---|
| A | 6 Rmax | Homogeneous | 0.1% |
| B | 18 Rmax | Dendritic | 3.6% |
| C | 8 Rmax | Corners weared | 0.3% |

A: Sintered Body according to the invention
B: Typical Body according to conventional sintering
C: Best-Quality Body according to conventional sintering From the above it is shown that a sintered body is provided which is homogeneous having tangled crystal growth formations and can highly satisfactorily be used as an electrical discharge machining electrode to yield excellent machining results.

Figure 2:
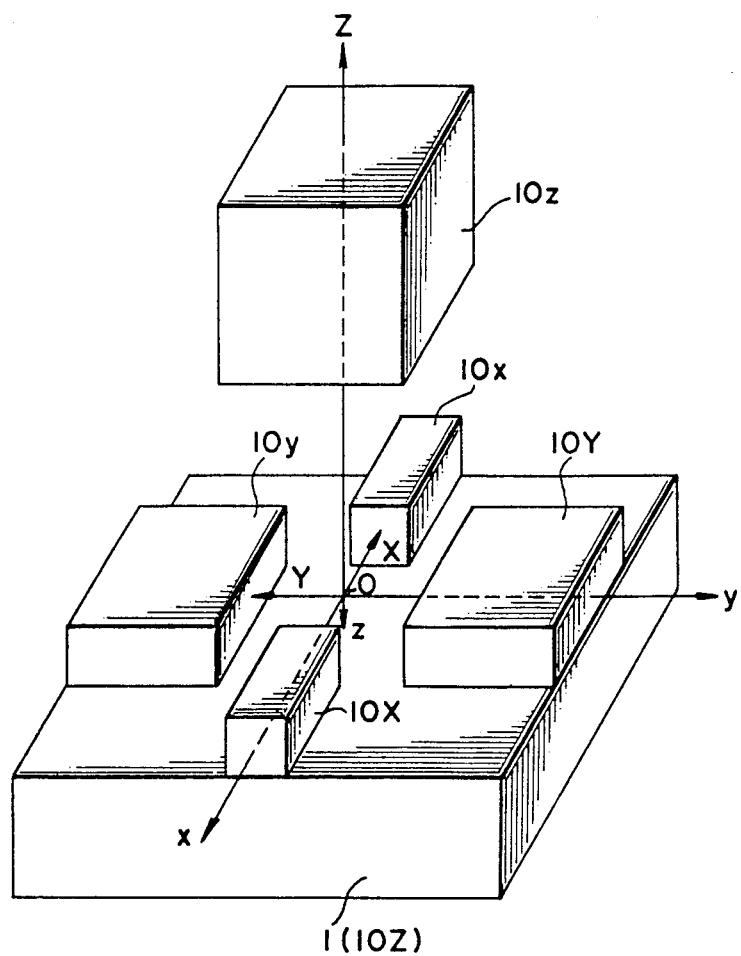
FIG. 2 is a perspective view diagrammatically illustrating a multi-axial compression punch/die arrangement according to the invention.
Figure 3:
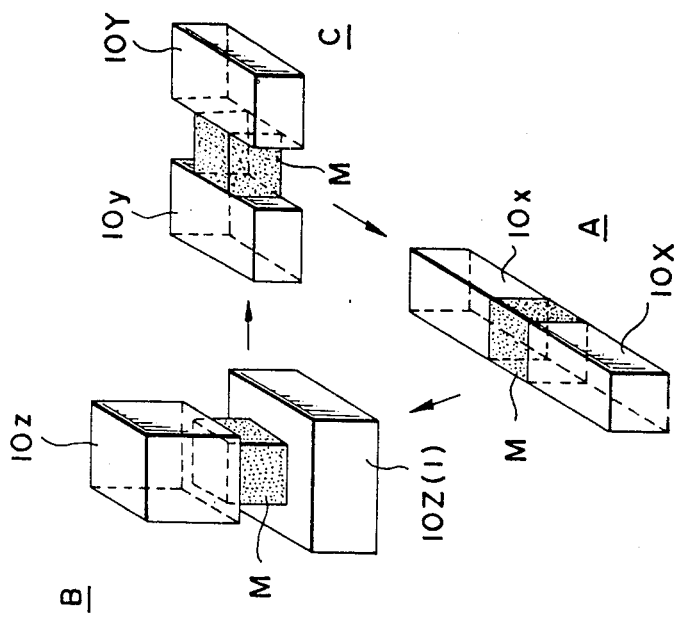
FIG. 3 is a perspective view diagrammatically illustrating a mode of operation of the arrangement of FIG. 2.

Referring to FIGS. 2 and 3, the structure and the operation of the multi-axis compression system of the invention may be described more specifically with reference to a certain example thereof. In FIG. 2, elements 1 and 10Z are shown forming a fixed die and a movable punch, respectively, for compressing a mass of particulate material M therebetween in the Z—z directions. On the stationary die 1, a pair of punches 10X and 10x are positioned for displacement along X—x axes which are perpendicular to the Z—z axes and a further pair of punches 10Y and 10y for displacement along Y—y axes which are perpendicular to both Z—z and X—x axes. The punch 10Z is capable of downward movement until its lower surface comes in contact with the upper surfaces of punches 10X, 10x, 10Y and 10y. When the punch 10Z reaches this lower limit, the other punches 10X, 10x, 10Y and 10y can be displaced smoothly on the die 1. When the punches 10Y and 10y come closest to each other, the punches 10X and 10x can be displaced smoothly between the juxtaposed surfaces of the punches 10Y and 10y on the die 1. Thus, when the punch 10Z lies at the lowest position and the punches 10Y and 10y come closest to each other, a closed rectangular space is formed by the juxtaposed surfaces of die 1 and the punches 10X, 10x, 10Y and 10y, constituting a compression and sintering chamber for the particulate mass M.

For the purpose of generating a sintering heat, a heating current is applied for passage through the mass M between at least one pair of the three press units. For the sake of convenience of grounding and electrical insulation of the equipment and pre-heating of other punches, the die 1 and the punch 10Z preferably serve as such a pair of the electrodes or conductors.

In operation, a mass of particulate mass M is placed centrally on the die 1 and may be first subjected to seriaxial compaction. The punch 10Z is lowered to its lowest position, the punches 10Y and 10y are advanced and then the punches 10X and 10x are moved toward each other. At this stage a preheating of the mass M may be effected by applying a heating current as described. In the table below there is shown an exemplary mode of the multi-axial compression, tri-axial compression which may be cyclically followed simultaneously with sintering process.

TABLE 2

| Compression | Press Operation | | |
|---|---|---|---|
| Step | Retract | Lock | Advance |
| A | Z (z) | Y (y) | X (x) |
| B | Y (y) | X (x) | Z (z) |
| C | X (x) | Z (z) | Y (y) |

In the step A the punch 10Z is slightly retracted and the punches 10X and 10x are advanced while the punches 10Y and 10y are stationary at their closed approach, causing the mass M to be compressed in the directions of X and x axes and to be expanded in the direction of Z-axis. In the step B the punches 10Y and 10y are slightly retracted and the punch 10Z is moved downward while the punches 10X and 10x are stationary, permitting the mass M to be compressed in the directions of Z and z axes and to be expanded in the directions of Y and y axes. In the step C, while the punch 10Z is locked, the punches 10X and 10x are retracted and the punches 10Y and 10y are advanced to compress the mass M in the directions of Y and y axes and allow it to be expanded in the directions of X and x axes. With the step C followed by the step A, the cycle is repeated several or a predetermined number of times while the mass M is heated under a controlled passage of sintering current therethrough in accordance with a given program.

Preferably, the stroke of advance of each punch is successively decreased over the multi-directional compression cycles toward the final stage in which the punch 10Z comes to the lowermost position and the punches 10Y and 10y are held at the closest approach under which state the punches 10X and 10x are actuated to apply a maximum, final pressure on the mass M.

In the present method, the multi-axial plastic deformation of the particulate material apparently is accompanied by the simultaneous heating and compaction to advantageously promote expulsion of heat-generated gases within the mass to eliminate irregular densification of the particles so that heating and compaction are effected uniformly throughout the mass to yield a homogeneously sintered, defect-free object. Thus, a high-quality sintered object is obtained with looser packed portions successively deformed and compacted to allow the gases to be effectively expelled without trapping in the mass.

Figure 4:
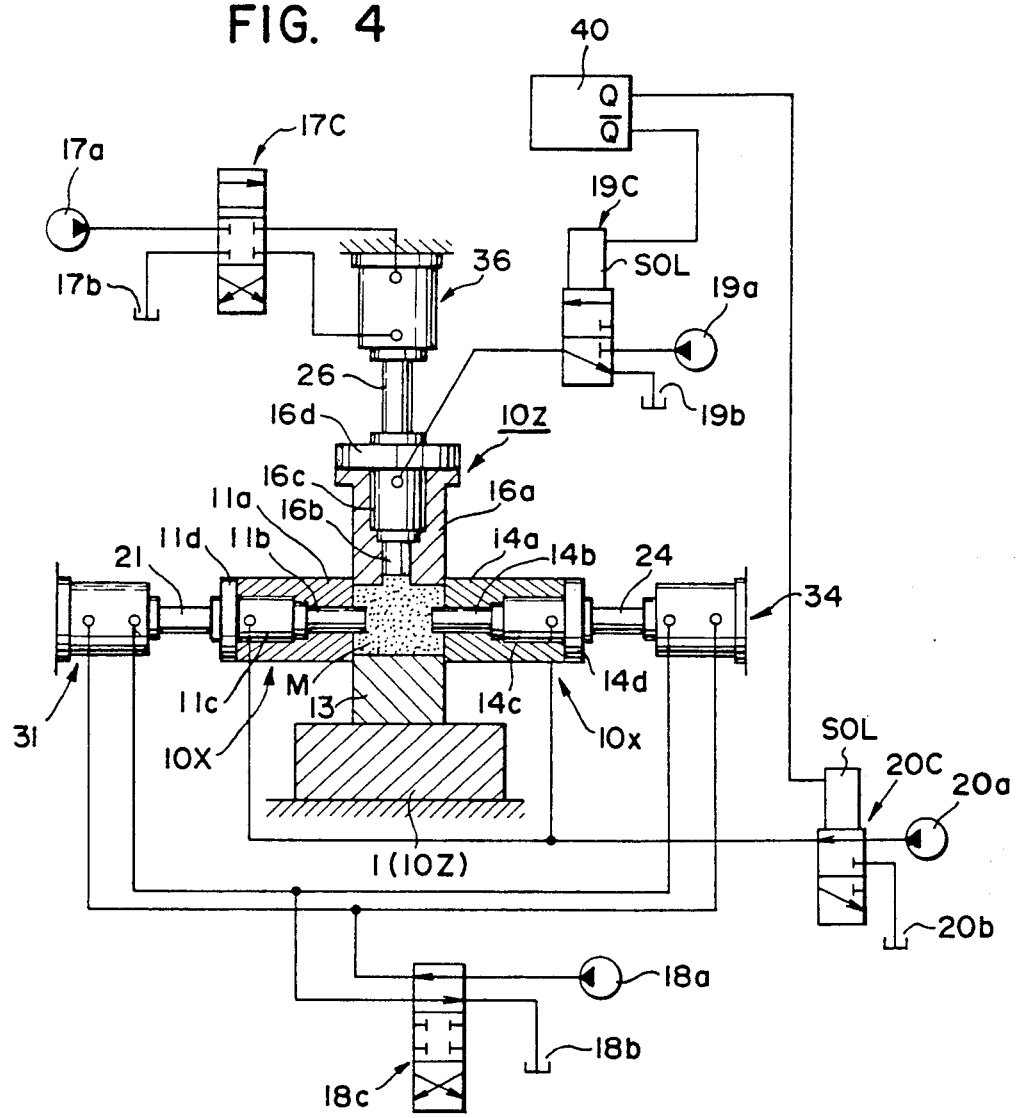
FIG. 4 is a diagrammatic view partly in section of an apparatus for carrying out the method according to the invention.

In the arrangement shown in FIG. 4 a punch 13 is mounted on the die 1 to receive the particulate mass M thereon. The Z-axis punch or press unit 10Z comprises an anvil 16a in contact with the mass M and a ram 16b coaxially received as slidably movable therein. The ram 16b is driven by a ram cylinder 16c coaxially received also in the anvil 16a and fixed thereto. A flange 16d couples the anvil-cylinder assembly 16a and 16c to the piston 26 which movably projects from the cylinder 36. Likewise, the X-axis press unit 10X and the x-axis press unit 10x each comprises an anvil 11a, 14a and a ram 11b, 14b each is driven by a ram cylinder 11c, 14c coaxially received also in the anvil 11a, 14a and fixed thereto. A flange 11d couples the anvil-cylinder assembly 11a–11c to the piston 21 which movably projects from the cylinder 31. A flange 14d couples the anvil-cylinder assembly 14a–14c to the piston 24 which movably projects from the cylinder 34. Although not shown, the Y-axis and y-axis press units are provided and each arranged likewise.

The Z-axis press cylinder 36 is operated by a hydraulic unit comprising a pump 17a, a fluid (oil) tank 17b and a four-way valve 17c to advance and retract the piston 26. The X-axis and x-axis press cylinders 31 and 34 are fed by a common hydraulic unit comprising a pump 18a, a liquid tank 18b and a four-way valve 18c to advance and retract the corresponding cylinders 21 and 24 conjointly. The Y-axis and y-axis press cylinders not shown have a similar hydraulic unit. With these hydraulic units, an initial static pressure is applied to the mass M with the X—x axes anvils 11a and 14a (and the Y—y axes anvils) brought closest to each other to sandwich the mass M therebetween and the Z-axis anvil 16a brought to the lowest position to compress the mass M against the punch 10Z.

The Z—z axes ram cylinder 16c is fed by a hydraulic unit comprising a pump 19a, a fluid tank 19b and a three-way valve 19c to move the ram 16b up and down against the mass M while the X-axis ram cylinder 11a and the x-axis ram cylinder 14c are conjointly operated by a common hydraulic unit comprising a pump 20a, a fluid tank 20b and a three-way valve 20c. Likewise, the Y-axis and y-axis ram cylinders have a similar construction. The Z—z axes and X—x axes drive control three-way valves 19c and 20c (and X—y axes drive control valve) are of an electromagnetic type and may have their respective inputs connected to the corresponding outputs of a control unit 40. In the illustration, the latter is shown having terminals Q and $\bar{Q}$ which are opposite in state so that the Z—z axes and X—x axes drive systems are under the opposite states to each other. Thus, when the "Q" signal operates the valve 20c to actuate the ram cylinders 11c and 14c so as to advance the rams 11b and 14b, the "$\bar{Q}$" signal operates the valve 19c to actuate the ram cylinder 16c so as to retract the ram 16b. When the output signals of the control unit 40 are reversed or shifted from the one state to the other, the valves 19c and 20c (and the Y—y axes valve) switch their states so that the ram cylinder 16c may be forwardly pressurized to advance the ram 16b and the ram cylinders 11c and 14c may be backwardly pressurized to retract the rams 11b and 14b (while the Y—y axes ram cylinders may be kept at neutral to hold the Y—y axes rams stationary). The shift of the output signals of the control unit 40 may alternatively be such as to turn one of the X—x axes and Z—z axes ram cylinders 11c, 14c and 16c to neutral while causing the other axes ram cylinders to be forwardly or backwardly pressurized to advance or retract the corresponding rams.

Such cycle may be successively effected several or a predetermined number of times while the mass M is continually heated to cause the latter to be multiaxially pressurized or kneaded under an elevated temperature until a final static pressure is applied unidirectionally or multidirectionally to complete the sintering thereof.

Figure 5:
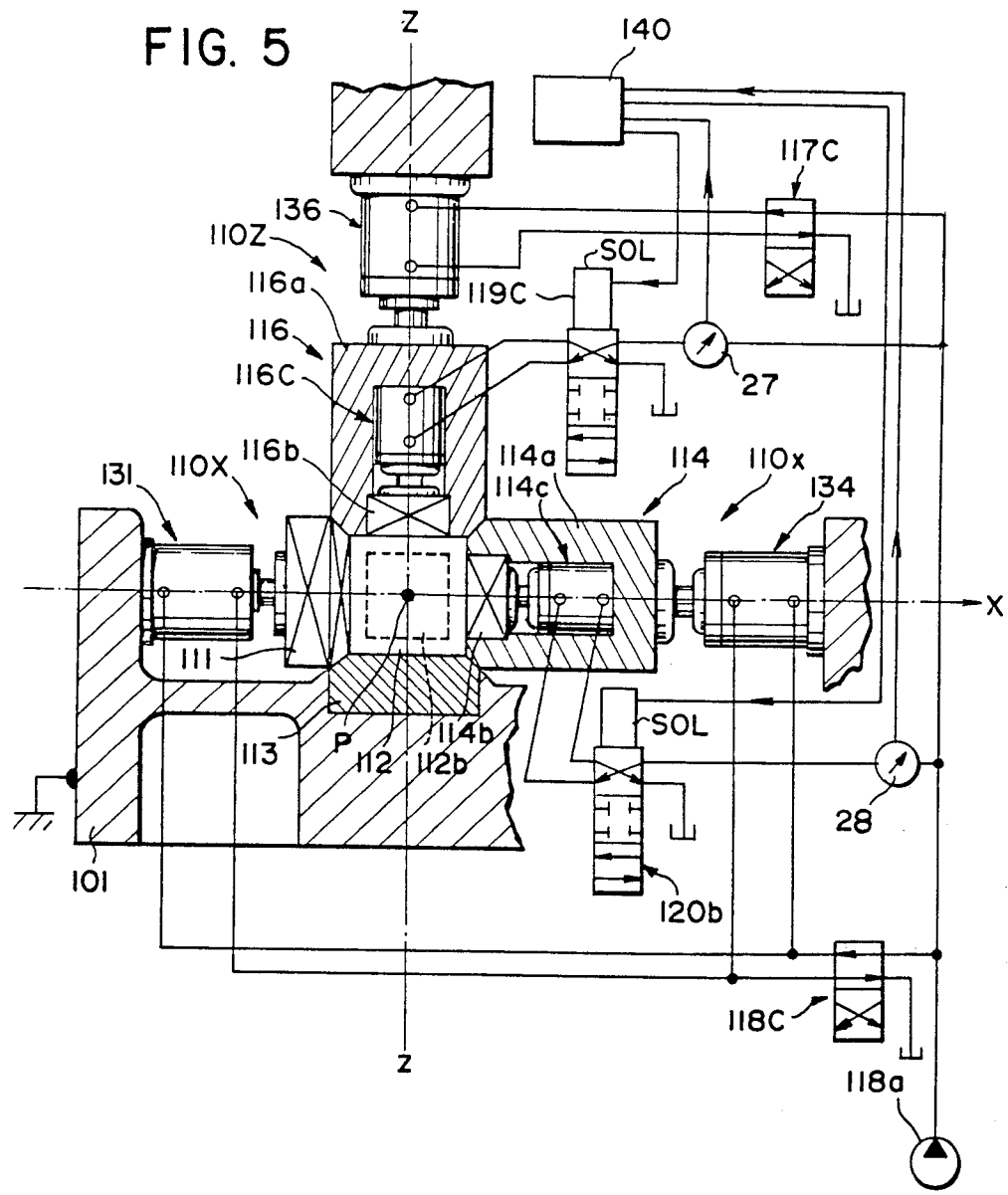
FIG. 5 is a diagrammatic view partly in section and partly broken of an arrangement similar to that of FIG. 4.

In an embodiment shown in FIG. 5 which is similar in construction to that of FIG. 4 oil meters 27 and 28 are provided to indicate the positions of rams 116b and 114b controlledly projecting from the ram cylinders 116c and 114c attached interior to the anvils 116a and 114a, respectively. The rams 116b and 114b which are displaceable in the anvils 116a and 114a, respectively, are shown both in the states most retracted by the cylinders 116c and 114c.

As already noted, the Z-axis press 110Z, X-axis press 110X and x-axis press 110x (and Y-axis and y-axis presses) are adapted to apply pressures to the particulate mass M in the directions perpendicular to one another, thus intersecting substantially at a point indicated at P. When the cylinders 13b, 131 and 134 are pressurized so that the punch assemblies 116, 111 and 114 respectively associated therewith are all extended, a closed rectangular or cubic space is provided above the die 113.

The strokes of the pistons of cylinders 136, 116c, 131, 134 and 114c are shown may be sized to be about one tenth or less of the edges L of the aforementioned closed space while the stroke of the piston of cylinder which carries the Y-axis punch unit 112 or the ram 112b (located at the front side of the paper) may be about 1.2 to 1.5 times of the length L. In the illustration, the Y-axis punch located on the front side of the paper is also assumed to be of single stroke type while the anvil of the y-axis punch located on the rear side of the paper to be fixed on the base 101.

Further, although not shown, a power supply for passing a sintering heat current through the particulate mass M may be connected, say, between the ram 116b and the die 113 which then serve as a pair of electrodes.

In operation, with all the cylinders pressurized so as to sufficiently retract the corresponding rams or punches, a mass of particulate mass M may be placed upon the die 113, the mass being dimensioned to be slightly less than the length L of the aforementioned closed space, whereafter the cylinders are operated to advance the corresponding rams or punches. Then, the four-way valves 117c and 118c and that not shown for Y-axis compression may be switched to pressurize the cylinders 136, 131 and 134 and that for Y-axis compression to advance the punch assemblies 116, 111, 114 and 112 to form the aforementioned closed space occupied by the particulate mass M.

At this stage the control unit 140 is operated to switch the four-way valves 119c and 120c which in turn pressurize the cylinders 116c and 114c so as to advance the rams 116b and 114b, respectively, thereby compressing the mass M. In the meantime, the ram 116b and the die 113 are energized with the power supply upon closure of an operating switch not shown to pass the heating current through the mass which thereby becomes softer and is compressed by the rams 116b and 114b.

The pressurized oil supplied to the cylinders 116c and 114c is measured at the oil meters 27 and 28 which provide signals in the form of pulses corresponding in number to the quantities of oil supplied, which are transmitted to the control unit 140. When the incoming pulses from the oil meters 27 and 28 reach a predetermined value, the control unit 140 acts to switch the corresponding four-way valves 119c and 120c to neutral. The cylinders 116c and 114c are then pressurized to advance the rams 116b and 114b by predetermined lengths l1 and l2, respectively, into the aforementioned closed space. Accordingly, the mass M assumes a volume:

$$V = L^3 - (A1 l1 + A2 l2)$$

where A1 and A2 represent the cross-sectional areas of the rams 116b and 114b.

The sizes L, A1, A2, l1 and l2 are strictly regulatable so that a number of sintered bodies or masses of an identical density and quality are obtained with due reproduction once the weight of each mass of particulate material M is given.

After the termination of each sintering cycle, the cylinders are pressurized to retract the corresponding rams or punches, whereupon the punch 112 may be projected to take out the sintered mass or body.

While the foregoing example utilizes the biaxial compression with Z-axis and x-axis punches, the use of the Z-axis punch alone may be sufficient when the compression rate or ratio of final and initial size is less than several percent. When this ration is in excess of, say, 15%, it is desirable to operate all the press punches multi-directionally so that the resultant mass has uniform densification.

While in the foregoing the triaxial press is employed comprising punches or rams adapted to form a cubic or rectangular closed space, three or four presses may alternatively be arranged together with vertical presses to form hexagonal or octagonal columnar closed space. In this case, punches for vertical compression are preferably of cross sections which correspond to those of horizontal punches so as to form the hexagonal or octagonal columnar closed space.

Further, the die punch and ram surfaces may be cylindrical, spherical, conical or likewise curved and this is particularly advantageous when a relatively high rate of compression is to be achieved to attain an exceedingly high densification.

A simpler arrangement may make use of a pair of die or mold and punch adapted to form a closed space in combination with a press unit having a punch or ram adapted to be projected into such closed space.

The oil meters 27 and 28 for detecting the positions of the rams may be replaced by other encoder or scale arrangements. Also, press units required to project the rams into the polyhedral closed space are, of course, not limited to hydraulic or oil-pressure presses as described.

Advantageously, the punches or rams are successively operated to successively alter the direction in which the pressure is applied to the mass as has been described.

As noted already, the invention allows the production of a highly homogeneous and extremely dense sintered or compacted body from a mass of particulate material which may be either of discrete particles or simply compacted or presintered. The body is homogeneous throughout, from the superficial portions in which the pressure is directly applied to the deepest interior zone in which the densification has been difficult to achieve with the prior techniques.

Figure 6:
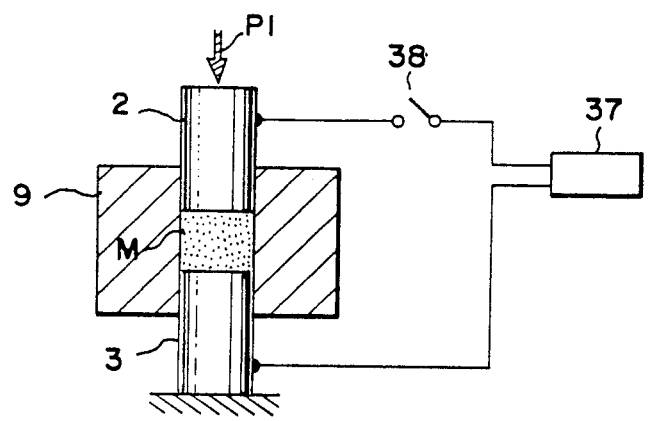
FIGS. 6 and 7 show in section a further embodiment of the invention.
Figure 7:
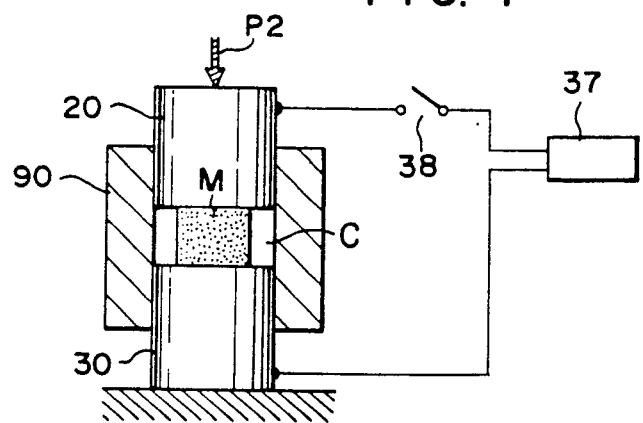

FIGS. 6 and 7 illustrate a novel sintering method which comprises the step of presintering a mass of particulate material, followed by the densification of the presintered mass. A presintering arrangement shown in FIG. 6 comprises a pair of punches 2 and 3 between which a particulate mass M is placed in a mold 9. A power supply 37 is connected to the punches 2 and 3 via an operating switch 38.

By means of a press unit not shown, a pressure p1 is applied to the mass M in the direction of arrow. Upon closure of the switch 38, a high-amperage electric current from the power supply 38 is passed through the mass M between the punches 2 and 3. The pressure p1 may range between 50 and 1000 Kg/cm² and, when initiated from a light pressure in the range of 40 to 50 Kg/cm², it is increased to 3000 to 4000 Kg/cm² or more in the final compaction stage. The electric power input applied to the mass M may range typically between 0.5 and 1.0 KW per gram with the switch 38 closed for the period of 30 to 150 seconds. In the case of sintering of graphite, a power input of 1 to 4 WH is required.

The density of the sintered body resulting from the first, pre-sintering step, which depends on the granular size and composition of particulate material as well as the pressure and current density, can be regulated by controlling the sintering period.

Figure 9:
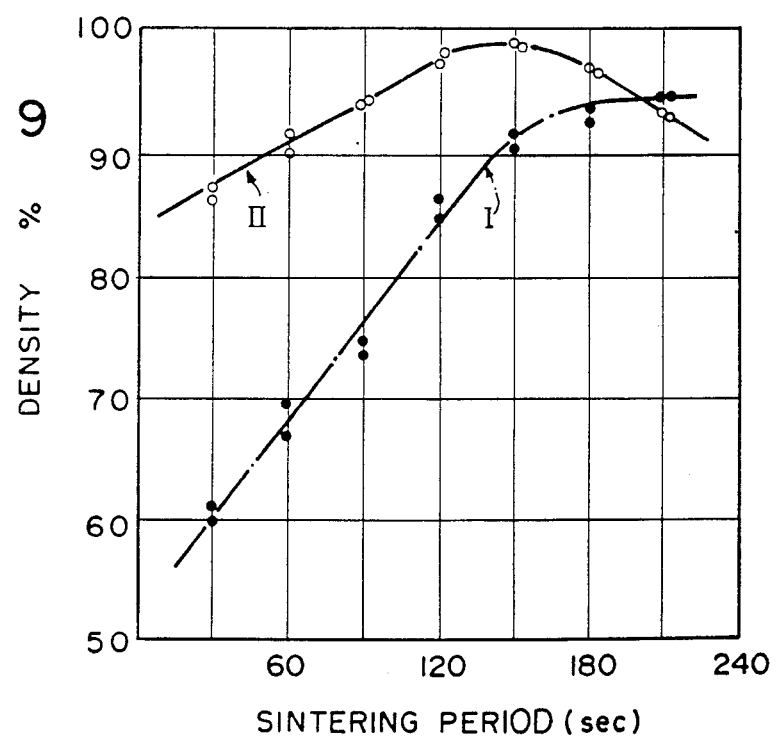

The relationship between the presintering density and the presintering period is shown by a curve I in FIG. 9 with reference to a tungsten powder of 20 gr. which is presintered using an electric power of 14 KW. The curve indicates that attempts to obtain a densely sintered mass of a density in excess of 90% require 150 seconds, practically 180 to 210 seconds for a single step. A similar relationship in the case of graphite is shown by a curve I in FIG. 10 which indicates that the single step to obtain a sintered graphite of more than 90% density requires a sintering period of more than 40 seconds, preferably 50 to 60 seconds. Heating for an excessive period is, however, disadvantageous since it causes the heated mass to stick itself firmly to the receiving mold or die. This problem is overcome in accordance with the invention by terminating the preliminary sintering when the mass density reaches 60 to 90% of the theoretical value of the material and subjecting the presintered mass to a secondary sintering process so as to densify it to 87% to 95% or more.

Referring to FIG. 7, an arrangement for carrying out the secondary sintering process comprises a pair of punches 20 and 30 and a mold 90 which form a sintering chamber C in which the presintered mass M is loaded. The punches 20 and 30 and the mold 90 are larger in cross section than the punches 2 and 3 and the mold 9 in the preliminary stage so that the mass placed coaxially and sandwiched between the punches 20 and 30 is spaced from the inner wall of the mold 90 to facilitate deformation and for effective electrical heating within the cavity in the secondary sintering stage.

In operation, the switch 38 is closed to apply the heating current which may be of the same order as that in the preliminary step through the presintered mass M for a period of time, which may be 60 to 90 seconds in the case of a metallic mass and in excess of 20 seconds in the case of a graphite mass, while a pressure p2 which may be of the same order as in the preliminary step is applied to the mass M.

The densification of the sintered mass eventually attainable depends upon the pressure and the electric power applied in the secondary sintering stage but is dependent upon the density obtained in the preliminary stage as well. Typical examples of this latter dependency are illustrated in FIGS. 9 and 10 which show that a maximum density of 99% can be achieved.

Referring to FIG. 9, the curve II representing the density of tungsten mass having been subjected to the secondary sintering step subsequent to the preliminary sintering step is compared with the curve I representing the density of the same mass having been subjected to the preliminary sintering step. It is shown that, for example, a mass densified to 90 to 95% in the presintering step by being subjected to heating for a period of 150 seconds can be further densified in the secondary sintering step to approximately 99%, the density which cannot be achieved with the presintering. A mass of 60% density resulting from the presintering step by heating for 30 seconds is capable of increasing its density to 87 to 88% in the secondary sintering step.

Figure 10:
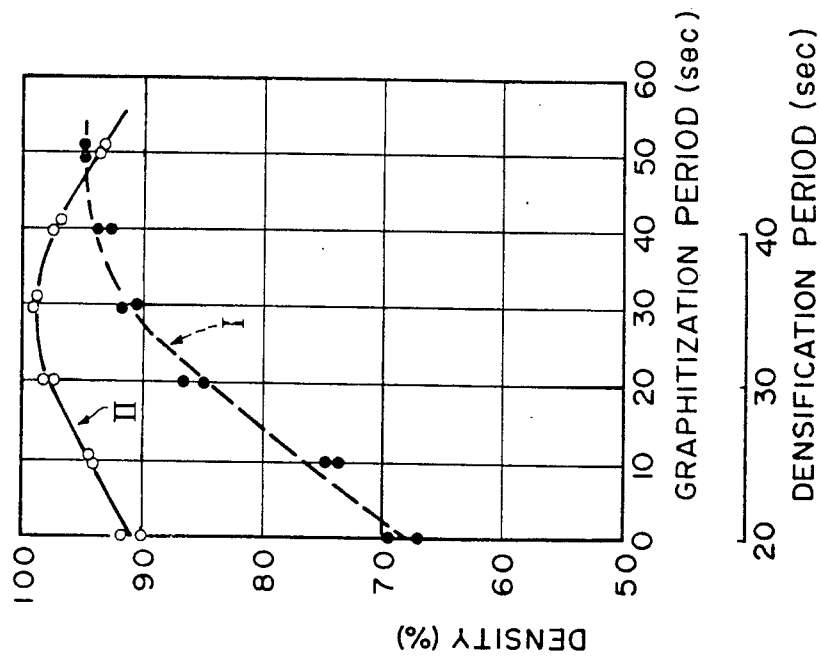
FIGS. 9 and 10 are graphical representations of characteristics of sintered materials according to the invention.

In FIG. 10, the curve II representing the density of carbon mass graphitized by the preliminary sintering step and subsequently densified by the secondary sintering step is compared with the curve I representing the density of the graphitized mass prior to the secondary sintering step. It is shown that, for example, a presintered or graphitized mass densified up to 90 to 92% by heating for a period of 30 seconds has its density increased to 99% by the secondary sintering. It is also shown that a presintered mass having a density of 75% after heating for 10 seconds is capable of being densified up to 95%.

It is interesting to note that the secondary sintering step may be repeated by a practical number of times under the same conditions to further the densification.

Figure 8:
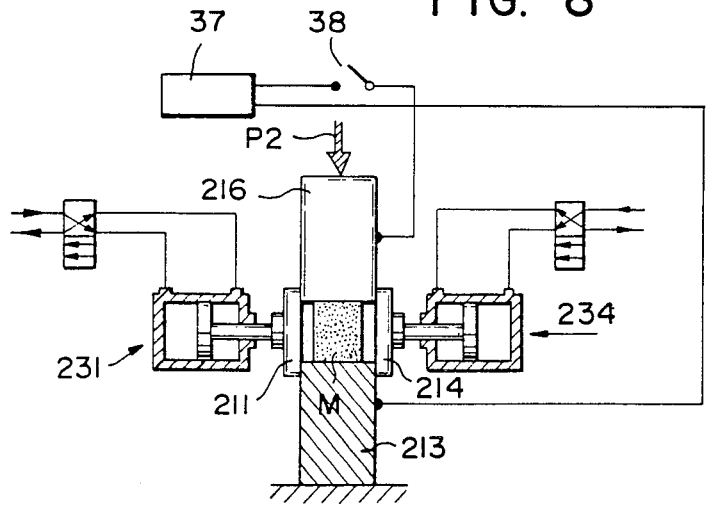
FIG. 8 shows in section and diagrammatic form a modified embodiment of the invention.

FIG. 8 shows a preferred arrangement for carrying out the secondary sintering or densification step by compressing and compacting the presintered mass multidirectionally. As in the systems earlier described, this arrangement employs, in addition to vertical punches for applying pressures to the mass M along Z z axes, horizontal punches for compressing the mass M along X, x, Y and y axes, of which X-axis and x-axis punches 211 and 214 are shown which are driven by hydraulic cylinder-piston units 231 and 234, respectively, as described earlier.

EXAMPLE II

A mass of tungsten powder of 20 grams was presintered using a sintering power of 14 KW and an initial mass compression pressure of 20 Kg/cm² and a final pressure of 350 Kg/cm². By employing various sintering periods ranging from 30 seconds to 210 seconds, six presintered masses No. 1 to No. 6 were obtained and each mass was subjected to the secondary sintering step using a pressure of 350 Kg/cm² and an electric power of 14 KW. The secondary step was carried out in a hydrogen atmosphere which was filled in the sintering chamber C. The punches were composed of graphite and the mold was an insulating refractory material both in the presintering and secondary step. The densities of the masses before and after the secondary sintering step were measured and are shown in the table below.

TABLE 3

| Mass Sample No. | Presintering Period (seconds) sec. | Density (%) Before % | Density (%) After % |
| --- | --- | --- | --- |
| 1 | 30 | 60 | 86 |
| 2 | 85 | 75 | 94 |
| 3 | 115 | 85 | 98.5 |
| 4 | 150 | 90 | 99 |
| 5 | 180 | 94 | 97 |
| 6 | 210 | 95 | 93 |

EXAMPLE III

Presintered masses of 3% carbon steel of particle sizes of 100 mesh and 10 mesh were secondary-sintered in a sintering chamber C filled with a nitrogen atmosphere, by applying a sintering power of 14 KW at a current density of 200 amperes/cm$^2$ to each mass for a period of 120 seconds. The results are shown in the table below.

TABLE 4

| Particle Size (mesh) | Presintered Density gr/cm$^3$ | % | Secondarily Sintered Density gr/cm$^3$ | % |
| --- | --- | --- | --- | --- |
| #100 | 6.2 | | 7.69 | 97.8 |
| #10 | 5.2 | | 7.82 | 99.5 |

In this example, presintered masses were bodies which after compaction under a pressure of 3 tons/cm$^2$ were sintered by heating at 1100° C. for a period of 40 minutes in the presence of hydrogen atmosphere.

EXAMPLE IV

A mass of pitch coke containing 10% of a hard pitch as a binder with 70% of carbon content was presintered under an initial pressure of 100 Kg/cm$^2$ and a final pressure of 350 Kg/cm$^2$ and with the application of an electric power at 0.8 WH/gr. By using various presintering periods, a number of presintered masses were obtained as labelled by No. 1 to No. 10 in the table below. Of the ten samples masses, sample No. 8, 9 and 10 were only partially graphitized. The presintered masses were then each secondarily sintered with the arrangement as shown in FIG. 7, using an electric power of 1.6 KW and a pressure of 400 Kg/cm$^2$. The secondary sintering for each mass had a period of 120 to 60 seconds until the mass was deformed to reach a ratio of deformation of 20% to result in a densified graphite body.

The presintering period, the presintered density and the secondarily sintered density for each mass treated are listed in the table below.

TABLE 5

| Sample No. | Presintering Period (sec) | Presintering Density (%) | Final Density (%) |
| --- | --- | --- | --- |
| 1 | 20 | 55–58 | — |
| 2 | 25 | 56–60 | — |
| 3 | 30 | 60–64 | 80–82 |
| 4 | 60 | 68–70 | 86–88 |
| 5 | 90 | 78–80 | 90 |
| 6 | 120 | 86–88 | 92–93 |
| 7 | 150 | 92 | 93 |
| 8 | 180 | 90–92 | 90–91 |
| 9 | 200 | 87–89 | 88–89 |
| 10 | 210 | 85–86 | 86–88 |

EXAMPLE V

Low-density graphite masses sintered in a conventional manner were purchased and sintered under the conditions identical to those employed in EXAMPLE IV above to obtain densified graphite bodies. The results are shown in the table below.

TABLE 6

| Sample No. | Initial Density (%) | Final Density (%) |
| --- | --- | --- |
| 11 | 75 | 90 |
| 12 | 75 | 91 |
| 13 | 75 | 91 |
| 14 | 76 | 91 |
| 15 | 74 | 90 |

EXAMPLE VI

A mass of petroleum coke of a granular size of 30 μm to which is added 8% of pitch containing 25% of carbon and 55% of pitch containing 70% of carbon was heated at a temperature of 300° C. and then at a temperature of 100° C. under a pressure of 2 tons/cm$^2$. The heat-treated and compacted mass was subjected to a preliminary sintering at a temperature of 2500° C. for graphitization. The presintered mass which had a density of 1.78 grams/cm$^3$ (79%) and a specific resistivity of 1100μ ohm-cm was machined to form a regular-hexagonal block. This presintered graphitized block was subjected with an arrangement as shown in FIG. 8 to a secondary sintering stage which comprises one to three successive repetitions along different mutually perpendicular compression axes of an operation in which an electric power of 2.0 WH/gr and a pressure of 450 Kg/cm$^2$ were applied to the block for a period of 60 seconds until the block was deformed to expand its size by 15 to 20% in the direction perpendicular to that in which the pressure was applied. The results are shown in the table below.

TABLE 7

| Sample No. | Material | Direction of Pressure | Density gr/cm$^2$ | % | Specific Resistivity μ ohm-cm |
| --- | --- | --- | --- | --- | --- |
| A | graphite (30μ powder) | Z | 1.78 | 79 | 1100 |
| 1 | sample A | Z | 2.06 | 91 | 710 |
| 2 | sample A | X | 2.08 | 92 | 720 |
| 3 | sample 1 | X | 2.09 | 93 | 650 |
| 4 | sample 3 | Y | 2.12 | 94 | 600 |

There is thus provided an improved method and apparatus for sintering a mass of particulate material, which overcomes the disadvantages encountered by prior sintering techniques.

What is claimed is:

1. A method of densifying a coherent mass of material having a density in the range between 60 and 90% of a maximum density of said material, said method comprising the steps of:
   (a) loading said mass into a substantially closed three-dimensional space defined by a first, a second and a third pair of punches juxtaposed thereacross in a first, a second and a third direction, respectively;

(b) energizing said mass with the thermal energy while multi-axially compressing said mass by advancing relatively to one another of said punches of each of said first, second and third pairs in the respective one of said first, second and third directions across said mass so that the axes of action of pressures extend thereon by said respective pairs of punches intersect substantially at a point substantially constituting a center of said three-dimensional space; and (c) successively modifying the pressures exerted on said mass by at least two of said first, second and third pairs of punches cyclically.

2. The method as defined in claim 1, wherein said axes are substantially perpendicular to one another.

3. The method as defined in either of claims 1 or 2 wherein said mass is a presintered metal or alloy.

4. The method as defined in either of claims 1 or 2 wherein said mass is a cast metal or alloy.

5. The method as defined in either of claims 1 or 2 wherein said mass is an at least partially graphitized carbon.

6. The method as defined in either of claims 1 or 2 wherein said thermal energy is applied to said mass by passing a high amperage electric current through said mass.

7. The method defined in either of claims 1 or 2 further comprising the step of maintaining the environment of said mass with a non-oxidizing atmosphere.

* * * * *

UNITED STATES PATENT AND TRADEMARK OFFICE
CERTIFICATE OF CORRECTION

PATENT NO. : 4,536,366
DATED : August 20, 1985
INVENTOR(S) : Kiyoshi Inoue

It is certified that error appears in the above-identified patent and that said Letters Patent are hereby corrected as shown below:

Column 5, line 62, "pressure on" should read --pressure to--.

Column 7, line 35, "are" should read --as--.

Column 13, line 7, "extend" should read --exerted--.

Signed and Sealed this

Nineteenth Day of November 1985

[SEAL]

Attest:

DONALD J. QUIGG

Attesting Officer

Commissioner of Patents and Trademarks